Sept. 15, 1936.   S. HEYMAN   2,054,478
ELECTRICAL CONDENSER
Original Filed March 24, 1932

INVENTOR
*Sam Heyman*
BY
*Dean, Fairbank, Hirsch & Foster*
ATTORNEYS

Patented Sept. 15, 1936

2,054,478

UNITED STATES PATENT OFFICE 2,054,478

ELECTRICAL CONDENSER

Sam Heyman, Brooklyn, N. Y., assignor to Aerovox Wireless Corporation, Brooklyn, N. Y., a corporation of New York Original application March 24, 1932, Serial No. 600,876. Divided and this application February 15, 1935, Serial No. 6,668

3 Claims. (Cl. 175—41)

My present invention is particularly concerned with condensers of the character in which a condenser stack together with its terminal structures are completely embedded in a molded body of insulating material with portions of the terminals protruding beyond the insulating material for connection in electrical circuits.

An object of the invention is to provide a condenser of this character in which the size of the molded casing is reduced to a minimum with respect to the size of the condenser stack embedded therein.

Another object is to provide a construction in which proper and effective electrical contact between the armatures of the stack and the terminals of the condenser is assured.

Another object is to provide terminal extensions or lead-outs which may be conveniently and expeditiously connected in electrical circuits, even where but little space is available for the introduction of a condenser. Said terminal ends furthermore are preferably sufficiently strong to actually support the weight of the condenser proper, even though the condenser be disposed some distance from the point of juncture of said terminal connection with the bus bars or wires or instruments of the circuit.

Another object is to provide a molded condenser having long strong bendable terminal extensions or shanks projecting beyond the molded, stack-encasing body and integral with the terminal head which engages the armatures of the condenser stack, whereby completely to obviate the need for secondary or intermediate electrical and mechanical connections between the projecting terminal shanks and the stack engaging terminal heads.

Another object is to provide a terminal including a portion capable of firmly embracing a condenser stack while making contact with the armatures thereof at a plurality of points, all parts of the terminal, however, being integral whereby firm electrical contact at any point assures establishing a good electrical contact between the condenser stack and the terminal clamp.

The present application is a division of my prior case, Serial No. 600,876, filed March 24, 1932.

Figure 1:
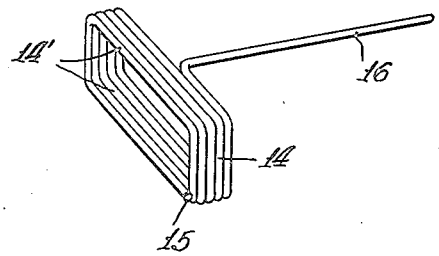
Figure 2:
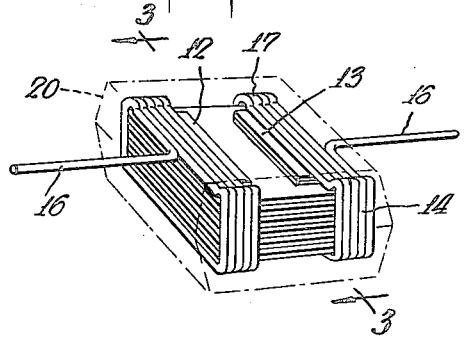
Figure 3:
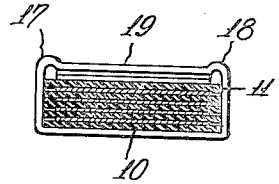
Figure 4:
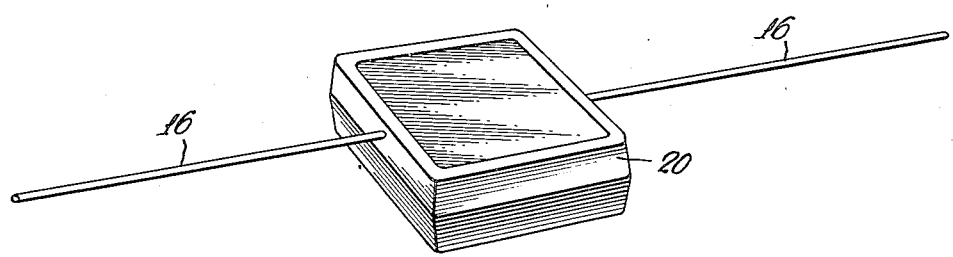

In the accompanying drawing in which is shown one of various possible embodiments of the several features of the invention, Fig. 1 is a perspective view of the condenser terminal, Fig. 2 is a perspective view of the condenser showing the molded casing in phantom view, Fig. 3 is a transverse sectional view taken on line 3—3 of Fig. 2, and Fig. 4 is a perspective view of the complete condenser.

Referring now to the drawing, the condenser unit is of conventional form, preferably a stack of alternate sheets of mica 10 and foil 11. The mica sheets are of the same size and aligned in a vertical stack, while the foils protrude alternately from the opposite ends of the stack, their extremities being turned over respectively at 12 and 13, for connection to the terminals now to be described.

Each terminal is preferably made of a unitary length of wire, conformed as a rectangular frame or sleeve. By use of an appropriate winding machine, the wire is wound into a plurality of convolutions 14 rectangular in contour, with the successive convolutions preferably in lateral engagement with each other, as shown, one extremity 15 of one of the wires preferably being at the end of the extreme convolution 14' and the other extremity of the wire 16 protruding as shown, generally at right angles outward from the middle of one side of the wire frame.

The convolute wire frame or sleeve is preferably of length slightly greater than the width of the condenser stack and of height slightly greater than the thickness of said stack, so that it may be readily slipped over the end of the stack without excessive friction or mutilation of the inturned foil ends 12 and 13. The device is then subjected to pressure, by a plunger (not shown) of width slightly less than the width of the stack and properly centered with respect thereto, to depress the upper runs of the wire loops, making up the terminal frame or sleeve, as best shown in Fig. 3, for snug mechanical and electrical contact with the infolded foil ends, thereby leaving shallow upstanding loops 17 and 18 between the sides of the frame and the depressed portions 19 thereof.

The condenser with its terminals is now preferably embedded in a molded plastic composition such as "bakelite" shown at 20, which completely encloses the condenser stack and its terminal frames and from opposite ends of which protrude the wire ends 16 serving for external terminal connection of the condenser.

It will thus be seen that there is herein described apparatus in which the several features of this invention are embodied, and which apparatus in its action attains the various objects of the invention and is well suited to meet the requirements of practical use.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

Having thus described my invention, what I claim as new and desire to secure by Letters Patent of the United States is:—

1. A terminal for condensers comprising a single length of wire, one end of which constitutes an elongated handle shank, the other end of the wire being bent into form to define a head transversely bendable into clamping engagement with a condenser stack, the head comprising a sleeve portion and formed by a plurality of laterally contiguous loops of wire, each loop completely to encircle a condenser stack.

2. A terminal for condensers comprising a single length of wire, one end of which constitutes an elongated handle, the other end of the wire being bent into form to define a head rectangular in contour, the head comprising a sleeve portion with one side compressible into clamping engagement with a condenser stack to be encircled thereby, said sleeve portion constituting a plurality of laterally contacting loops of wire.

3. A terminal for condensers comprising a single length of wire, one end of which constitutes an elongated handle, the other end of the wire being bent into form to define a head generally rectangular in contour, said head being formed with shallow upstanding loops extending the length of a pair of parallel edges thereof, the length and width of said head between said shallow loops being depressed relative to the crests of said loops.

SAM HEYMAN.